United States Patent
Pham et al.

(10) Patent No.: US 6,754,688 B2
(45) Date of Patent: Jun. 22, 2004

(54) METHOD AND APPARATUS TO CALCULATE THE DIFFERENCE OF TWO NUMBERS

(75) Inventors: Giao Pham, Portland, OR (US); Mathew J. Parker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 09/783,235

(22) Filed: Feb. 14, 2001

(65) Prior Publication Data

US 2002/0138539 A1 Sep. 26, 2002

(51) Int. Cl.⁷ ............................ G06F 7/42; G06F 15/00; G06F 7/38
(52) U.S. Cl. ...................... 708/505; 708/205; 708/495
(58) Field of Search .............................. 708/495–514, 708/205

(56) References Cited

U.S. PATENT DOCUMENTS

| | | | | |
|---|---|---|---|---|
| 4,849,923 A | * | 7/1989 | Samudrala et al. | 708/505 |
| 5,010,508 A | * | 4/1991 | Sit et al. | 708/505 |
| 5,027,308 A | * | 6/1991 | Sit et al. | 708/505 |
| 5,122,981 A | * | 6/1992 | Taniguchi | 708/497 |
| 5,390,134 A | * | 2/1995 | Heikes et al. | 708/497 |
| 5,742,537 A | * | 4/1998 | Wolrich et al. | 708/497 |
| 5,790,445 A | * | 8/1998 | Eisen et al. | 708/505 |
| 6,085,208 A | * | 7/2000 | Oberman et al. | 708/205 |
| 6,131,106 A | * | 10/2000 | Steele, Jr. | 708/510 |
| 6,205,460 B1 | * | 3/2001 | Steele, Jr. | 708/495 |
| 6,205,461 B1 | * | 3/2001 | Mansingh | 708/497 |

* cited by examiner

*Primary Examiner*—Todd Ingberg
*Assistant Examiner*—Chat C Do
(74) *Attorney, Agent, or Firm*—Blakely, Sokoloff, Taylor & Zafman LLP (57) ABSTRACT

An apparatus and method for determining whether two operands are less than two are disclosed. A first module generates first detection bits from a first operand and a second operand, where the first detection bits indicate a difference of zero. A second module generates second detection bits from the first and second operands, where the second detection bits indicate a difference of one. A combiner combines the first and second detection bits to determine whether the difference of two numbers is less than two. The apparatus and method is used in determining to bypass normalization in floating point calculation.

20 Claims, 5 Drawing Sheets

|  | Bits [16:9] 610 | Bit [8] 620 | Bits [7:0] 630 |
|---|---|---|---|
| Operand 1 | 8 bits | 1 bit | 8 bits |
| Operand 2 | 8 bits | 1 bit | 8 bits |

FIG. 7

| b[8] | b[7] | b[6] | b[5] | b[4] | b[3] | b[2] | b[1] | b[0] |
|---|---|---|---|---|---|---|---|---|
| 256 | 128 | 64 | 32 | 16 | 8 | 4 | 2 | 1 |

710 brackets b[8] through b[4]

FIG. 8

METHOD AND APPARATUS TO CALCULATE THE DIFFERENCE OF TWO NUMBERS

FIELD OF THE INVENTION

The present invention relates to the field of data processing, and more particularly to a method and apparatus for floating point arithmetic.

PRIOR ART

Many computer systems include processors having specialized arithmetic circuitry to operate on floating point numbers. Specialized circuitry is required because, unlike fixed-point numbers, floating point numbers are represented by a normalized component called a mantissa, and an exponent. Before adding or subtracting two floating point numbers, the difference of their exponents is obtained to adjust and align these numbers. The exponent difference is amount needed to shift one of the floating point mantissa. This process is known as denormalization.

To speed up the floating point calculations, the exponent difference is compared with the maximum shift value number, which is predetermined based upon the precision of the floating point operation. If the difference is equal or greater than the maximum shift value, the shift operation is bypassed. Otherwise, the difference controls the amount of shift.

The exponent difference is typically calculated using the subtractors (or adders), causing a long processing time because the adder must be finished before the exponent difference can be compared. Furthermore, when two floating point numbers are close in values, the result of an addition or subtraction undergoes a complex normalization, which is the reverse of the denormalization. This requires still more logic and delays to implement, thereby increasing power consumption, circuit size and fabrication cost.

BRIEF DESCRIPTION OF THE DRAWINGS

The invention will be described in detail with reference to the following drawings in which like reference numerals refer to like elements wherein.

DETAILED DESCRIPTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

The invention allows a fast computation in floating point arithmetic. One embodiment allows a bypass of the denormalization procedure if the exponent difference using a predetermined number of most significant bits (MSB) is greater than a maximum shift value, where the maximum shift value is higher than the number of bits representing the mantissas of the floating point numbers. In another embodiment, a complex normalization is bypassed if the exponent difference of two floating point operands are not less than two.

In the following description, the term "computer readable medium" includes, but is not limited to portable or fixed storage devices, optical storage devices, and any other memory devices capable of storing computer instructions and/or data. Here, "computer instructions" are software or firmware including data, codes, and programs that can be read and/or executed to perform certain functions. For example, the computer instruction may be instructions used in scalar operations or a single instruction used in a Single Instruction, Multiple Data (SIMD) architecture.

Figure 1:
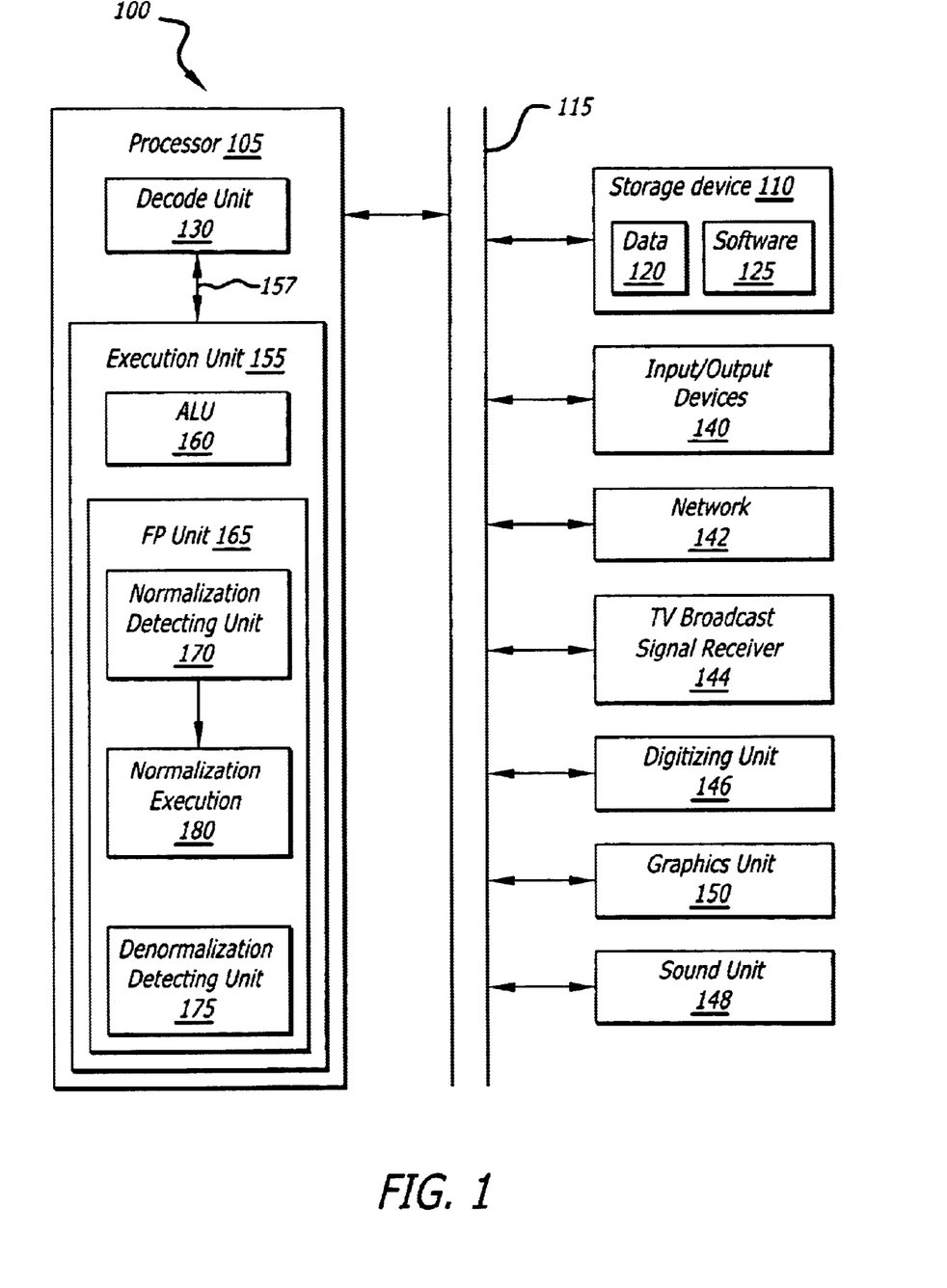
FIG. 1 illustrates a computer system in accordance to one embodiment of the invention.

FIG. 1 illustrates one of many embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices 140, such as a keyboard, mouse and display, are also coupled to the bus 115.

The processor 105 represents a central processing unit of any type of architecture, such as Complex Instruction Set Computer (CISC), Reduced Instruction Set Computer (RISC), very long instruction word (VLIW), or a hybrid architecture (e.g., a combination of hardware and software translation). Also, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., Accelerated Graphics Port "AGP", Peripheral Component Interconnect "PCI", Industry Standard Architecture "ISA", Extended Industry Standard Architecture "EISA", Video Electronics Standard Architecture "VESA" and the like) and bridges (also termed as bus controllers). While this embodiment is described in relation to a single processor computer system, the invention could be implemented in a multi-processor computer system.

Furthermore, devices including but not limited to one or more of a network 142, a TV broadcast signal receiver 144, a digitizing unit 146, a sound unit 148, and a graphics unit 150 may optionally be coupled to bus 115. The network 130 represents one or more network connections (e.g., an Ethernet connection). The TV broadcast signal receiver 144 represents a device for receiving TV broadcast signals. The digitizing unit 146 represents one or more devices for digitizing images (e.g., a scanner, camera, etc.). The sound unit 148 represents one or more devices for inputting and/or outputting sound (e.g., sound card, microphones, speakers, magnetic storage devices, optical storage devices, etc.). The graphics unit 150 represents one or more devices for generating images (e.g., graphics card).

FIG. 1 also illustrates that the storage device 110 has stored therein data 120 and software 125. Data 120 represents data stored in one or more of the formats described herein. Software 125 represents the necessary code for performing any and/or all of the techniques in accordance with the present invention. It will be recognized by one of ordinary skill in the art that the storage device 110 may contain additional software (not shown), which is not necessary to understanding the invention.

FIG. 1 additionally illustrates that the processor 105 includes decode unit 130 and an execution unit 155 for executing instructions. It will be recognized by one of ordinary skill in the art that the processor 105 contains additional circuitry, which is not necessary to understanding the invention. The decode unit 130 and execution unit 155 are coupled together by internal bus 157. The decode unit 130 is used for decoding instructions received by processor 105 into control signals and/or microcode entry points. In response to these control signals and/or microcode entry points, the execution unit 155 performs the appropriate operations. The decode unit 130 may be implemented using any number of different mechanisms (e.g., a look-up table, a hardware implementation, a programmable logic array "PLA," etc.).

The execution unit 155 is shown including an arithmetic logic unit (ALU) 160 and a floating point (FP) unit 165. The ALU 160 performs arithmetic computations (e.g., addition multiplication, and/or comparison operations) while the FP unit 165 performs floating point calculations. In one possible embodiment, the FP unit 165 includes a normalization detecting unit 170 and a normalization execution unit 180. The normalization detecting unit 170 determines whether a complex normalization can be bypassed and the normalization execution unit 180 performs the complex normalization for floating point calculation if normalization is not bypassed. The FP unit 165 may further include a denormalization detecting unit 175 to determine whether denormalization can be bypassed. While the invention is described with reference to floating point numbers, alternative embodiments may contain different number formats and still utilize the teachings of the invention.

Figure 2:
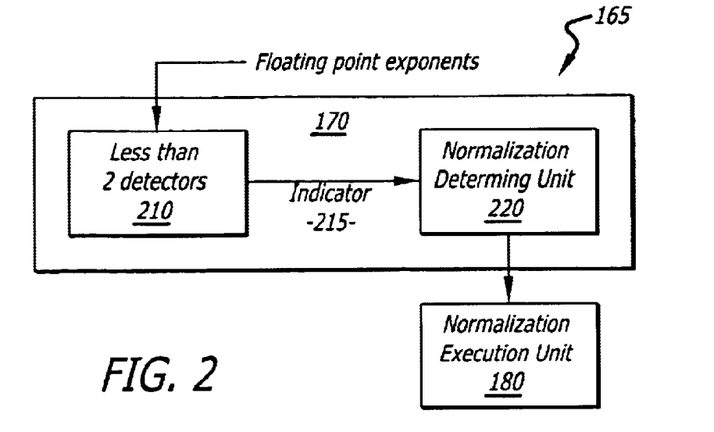
FIG. 2 illustrates a floating point unit in accordance to one embodiment of the invention.

FIG. 2 shows one embodiment of the normalization detecting unit 170, including a less-than-two detector 210 and a normalization determining unit 220. The less-than-two detector 210 detects if the exponent difference of a first and second floating point numbers is less than two to output an indicator signal 215. The normalization determining unit 220 determines whether to bypass the complex normalization in the floating point calculation, based upon the indicator signal 215. Accordingly, the normalization execution unit 180 performs normalization for floating point calculation if normalization is not bypassed.

Figure 3:
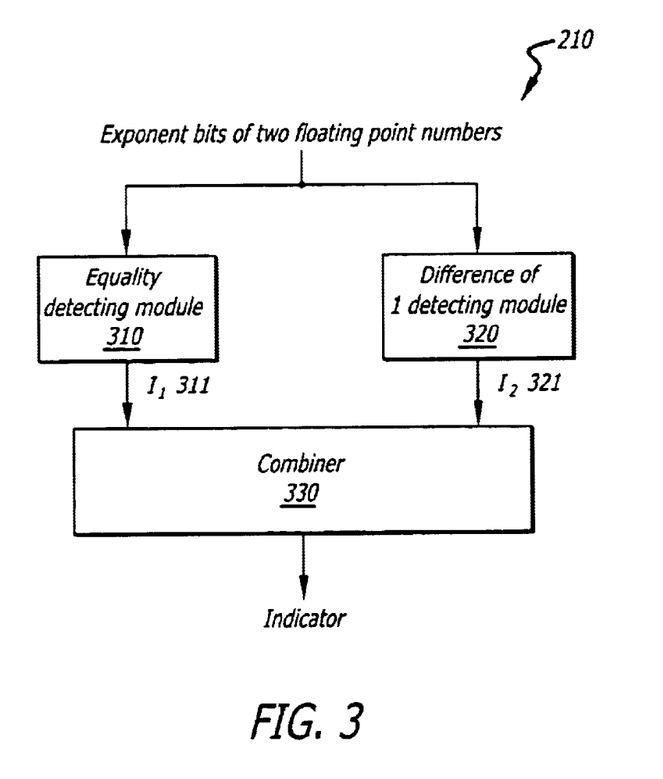
FIG. 3 illustrates a less-than-two detector in accordance to one embodiment of the invention.

FIG. 3 shows one embodiment of the less-than-two detector 210 including an equality detecting module 310, a difference-of-one detecting module 320, and a combiner 330. The equality detecting module 310 generates detection bit $I_1$ 311 from the exponents of a first and second floating point numbers to indicate if the exponent difference of the two floating point numbers is zero. The difference-of-one detecting module 320 generates detections bit $I_2$ 321 from the exponents of the two floating point numbers to indicate if the exponent difference of the two floating numbers is one. The combiner 330 determines whether to bypass the complex normalization based upon the detection bits $I_1$ 311 and $I_2$ 321, and outputs the indicator signal 215.

Figure 4A:
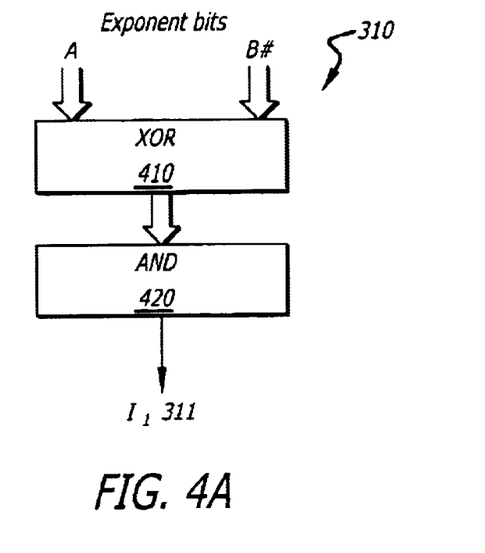
FIGS. 4A and 4B illustrate implementation of less-than-two detectors in accordance to one embodiment of the invention.

One of many possible embodiment of the equality detecting module 310 includes a half summer summing the exponent bits of the first floating point number and an inverted exponent bits of the second floating point number. FIG. 4A shows one possible embodiment of the equality detecting module 310, in which the detection bit $I_1$ 311 is calculated by bitwise XORing the exponent bits of the first floating point number to the corresponding exponent bits of the second floating point number to generate a SUM value, and ANDing the results. Accordingly, the equality detection module 310 includes a XOR gate 410 and an AND gate 420. Here, the symbol "#" indicates an inverted state.

If two operands are equal, the resultant SUM value of (Operand1+inverted Operand2) or (Operand2+inverted Operand1) is 1. In FIG. 4A, if the exponents are equal, the resultant SUM values of (A+B#) or (B+A#) for each bit will be 1s. Thus, when all SUM values of 1 are detected, the two exponents are equal. For example, assume a 3-bit exponent of a first floating point A=101 and a 3-bit exponent of a second floating point B=101. The operation is as follows.

B#=010 or A#=010

A XOR B#=111 and B XOR A#=111

ANDing {111}, the detection bit $I_1$=1.

While the invention has been described using floating point exponents, the invention is applicable to two operands having formats other than the binary format of the floating point exponents. Moreover, the teachings of the invention is applicable to determine whether the difference of two numbers is zero, such as when two numbers are equal for example.

Referring back to FIG. 3, one of many possible embodiment of the difference-of-one detecting module 320 includes a first half summer summing the exponent bits of the first floating point number and an inverted exponent bits of the second floating point number to generate a SUM value number; an adder summing the exponent bits of the first floating point and the inverted exponent bits of the second floating point to generate a half carry value; and a second half summer summing the SUM value and the carry value corresponding to a previous SUM value to generate the second detection bit $I_2$ 321.

In one embodiment, in which the two operands are binary numbers, one of the following is true.

I. Two binary numbers are different by a value of one if the most significant bits (MSB) are the same while one or two least significant bit(s) (LSB) are different. For example, {101001 and 101000} or {011010 and 011001}. In the first case, half summing MSBs of a first binary number with inverted MSBs of a second binary number results in all half sums of 1s while half summing the last 1 LSB of the first binary number with the last 1 LSB of the second binary number results in a half sum of 0, where the second binary number is greater than the first binary number. Here, all half carries calculated using the first binary number bits and the inverted second binary bits are 0s. Similarly, in the second case, using first binary number bits and inverted second binary number bits, all half sums of the MSBs are 1s while the last 2 LSBs are 0s and the carry bit 1 is 0 while the carry of bit 0 is 1, where the second binary number is greater than the first binary number.

II. Two binary numbers are different by a value of one if the MSBs are the same except the LSBs of one operand are 1 followed by all 0s while the LSBs of the other operand are 0 followed by all 1s or if one operand is all 0s while the other is all 1s. For example, {101010000 and 101001111} or {00000000 and 11111111}. In the first case, using the bits of a first binary number and inverted second binary number, all half sums of the equal MSBs are 1s while all the half sums of the unequal bits are 0s, where the second binary number is greater than the first binary number. Also, the half carries of the equal MSBs and one unequal bit following the MSBs are 0s while the remaining half carries are 1s. In the above example, equal MSBs are {1010} while the unequal bits are {10000} and {01111}. In the second case, using the bits of a first binary number and inverted second binary number, all the half sums are 0s while all the carries are 1s, where the second binary number is greater than the first binary number.

Figure 4B:
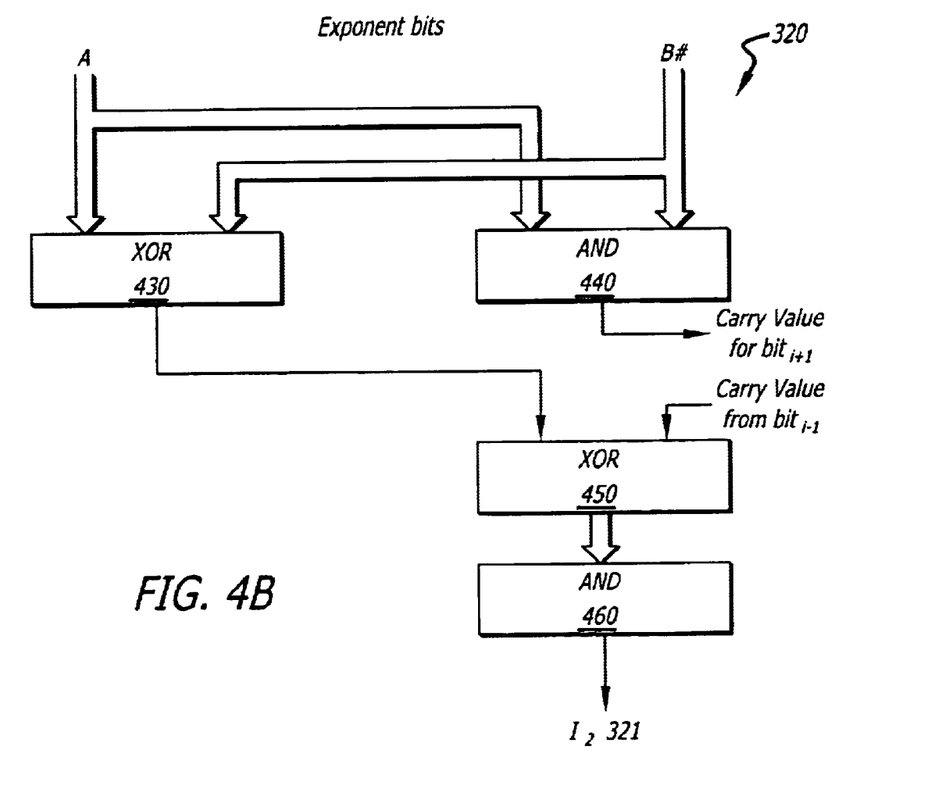

FIG. 4B shows one possible embodiment of the difference-of-one detecting module 320 using the above logic, in which the detection bit $I_2$ 321 is calculated by bitwise XORing the exponent bits of the first floating point number with corresponding exponent bits of the second floating point number to generate first SUM values, bitwise ANDing the corresponding exponent bits of the two floating points to generate the carry value, XORing each first SUM value with a carry value corresponding to previous exponent bits to generate second SUM values, and ANDing the results. Here, the symbol "#" indicates an inverted state.

Therefore, assuming two operands are different by one, if Operand1>Operand2, each second SUM value of XORing the first $SUM_i$ value (Operand2+inverted Operand 1) and $Carry_{i-1}$ will be 1. Similarly, if Operand2>Operand1 by one, each second SUM value of XORing the first $SUM_i$ value (Operand1+inverted Operand 2) and $Carry_{i-1}$ will be 1. Thus, when all second SUMs of 1 are detected, the two operands are different by 1.

Particularly, in FIG. 4B, the half sums of (A+B#) or (B+A#) for each bit is calculated using a XOR gate 430 to generate first $SUM_i$ value for bit i. The exponents also summed using an AND gate 440 to generate a carry value for bit i+1 . The first SUM, values and $Carry_{i-1}$ values are summed using a XOR gate 450 to generate second SUM values. Here, the carry bit values are shifted left and added to the first SUMi bit values, where the first carry bit value is 1. When all second SUM values of 1 are detected by ANDing the second SUM values using an AND gate 460, the difference of two exponents are one. For example, assume a 3-bit exponent of a first floating point A=101 and a 3-bit exponent of a second floating point B=100. The operation is as follows:

I. A+B#, where B#=011
first SUM=A XOR B#=110
carry=A AND B#=011 second SUM = first $SUM_i$ XOR $carry_{i-1}$ = 0 XOR 1 = 1

= 1 XOR 1 = 0

= 1 XOR 0 = 1.

In this case ANDing {101}≠1.

II. B+A#, where A#=010
first SUM=B XOR A#=110
carry=B AND A#=000 second SUM = first $SUM_i$ XOR $carry_{i-1}$ = 0 XOR 1 = 1

= 1 XOR 0 = 1

= 1 XOR 0 = 1.

In this case ANDing {111}=1.

As shown, if the detection bit $I_2$ 321 for one of the cases, i.e. (A+B#) or (B+A#), results in a value of 1, the exponent difference is determined to be one. Note that one of (A+B#) or (B+A#) will detect the difference of one, depending upon whether A>B or B>A. If A>B, (B+A#) detects the difference of one, otherwise if B>A, (A+B#) detects the difference of one. Accordingly, in application, (A+B#) may first be calculated and if the detection bit $I_2$ 321 is "1," the exponent difference would be determined to be one. Otherwise, (B+A#) would be calculated if the detection bit $I_2$ 321 for (A+B#) is not "1." If the detection bit $I_2$ 321 for (B+A#) is one, the exponent difference would be determined to be one. Alternatively, both (A+B#) and (B+A#) may simultaneously be calculated to determine if the exponent difference is one.

While the invention has been described using floating point exponents, the invention is applicable to two operands having formats other than the binary format of the floating point exponents. Moreover, the teachings of the invention are applicable to determine whether the difference of two numbers is one.

Figure 5:
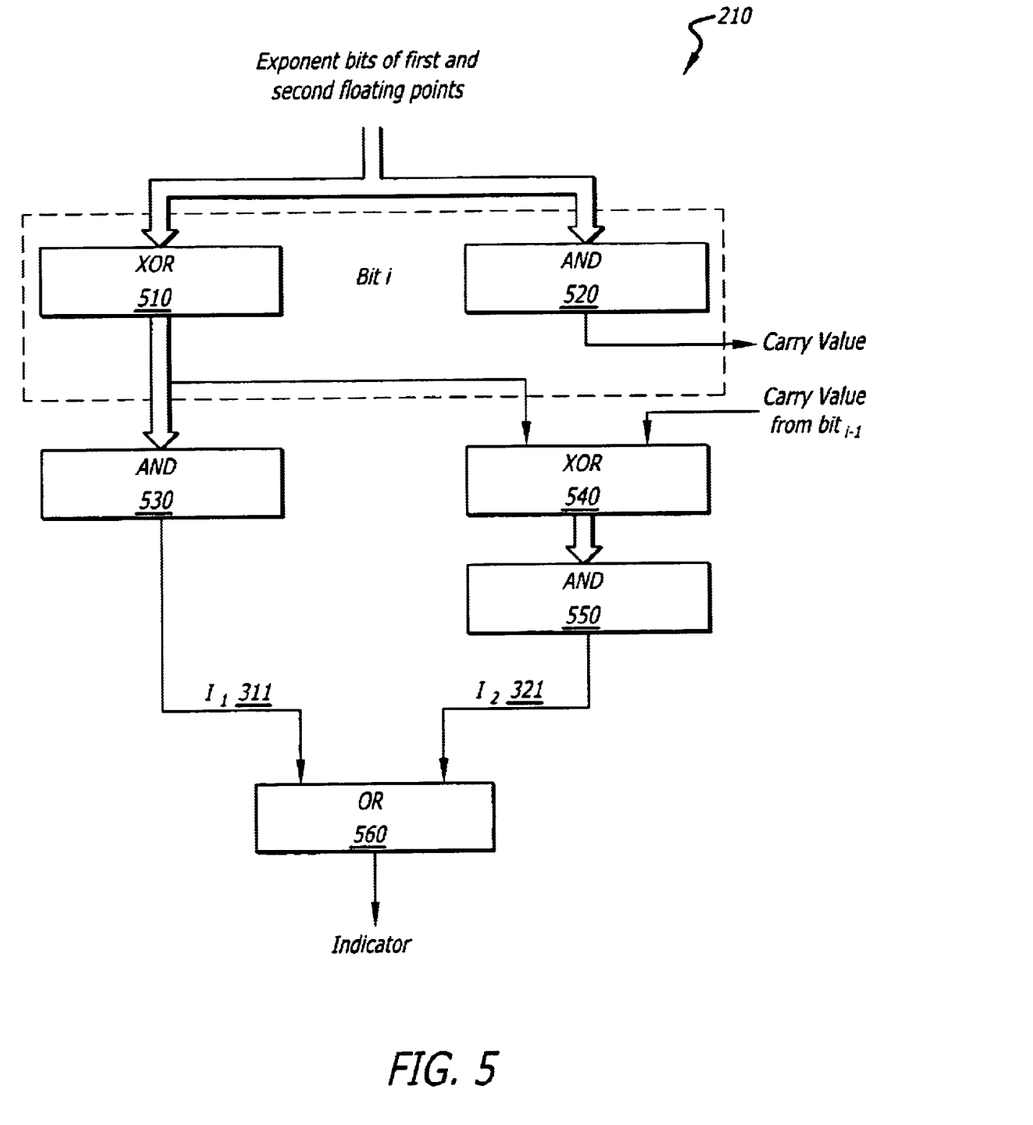
FIG. 5 illustrates implementation of a less-than-two detector in accordance to another embodiment of the invention.

FIG. 5 shows another embodiment of the less-than-two detector 210 in which the equality detecting module 310 and the difference-of-one detecting module 320 have been combined. In this embodiment, the less-than-two detector 210 comprises a first XOR gate 510 bitwise XORing the corresponding exponent bits of the first and second floating point numbers to generate a first SUM value, where one of the exponent bits is inverted, and a first AND gate 530 ANDing the first SUM values to generate the detecting bit $I_1$ 311. The less-than-two detector 210 further includes a second AND gate 520 bitwise ANDing the corresponding exponent bits of the first and second floating point numbers to generate carry values, where one of the exponent bits is inverted, a second XOR gate 540 XORing each first SUM value to a carry value corresponding to the previous SUM value to generate the second SUM values, and a second AND gate 550 ANDing the second SUM values to generate the detecting bit $I_2$ 321. Thereafter, an OR gate 560 ORs the detecting bits $I_1$ 311 and $I_2$ 321 to generate the indicator signal 215. Here, the indicator signal 215 value of 1 indicates that the exponent difference is less than 2.

By determining if the exponent difference is less than 2, the floating point calculation speed can significantly be increased, as the complex normalization can be bypassed for exponent different not less than 2. The floating point calculation speed can further be improved by bypassing the denormalization if the exponent difference is greater that the maximum shift value.

Typically, the maximum shift value is set equal to the total number of bits representing the mantissa of the floating points. In one embodiment, a maximum shift value is set higher than the total number of bits of the mantissa.

Figure 6:
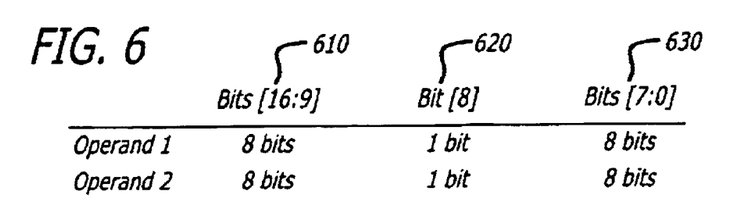
FIG. 6 illustrates exponent bits of two operands in accordance to one embodiment of the invention.

For purposes of explanation, and not intended to limit the invention, the embodiment will be described for floating point number represented by 67 bit mantissa and 17 bit exponent. In one embodiment, the 17 bit exponent is divided into two independent 8 bit segments 610, 630 and a signal bit 620 as shown in FIG. 6. The 8 bit segments 610, which are the MSBs of the exponents, are compared to determine if the difference is less than two. Thereafter, a determination whether the exponent difference exceeds the maximum shift value is made. Also, the maximum shift value is set to 80, but may be set to other values in different embodiments.

Namely, let A=8 MSBs of a first exponent and B=8 MSBs of a second exponent. Also, let A#=inverted 8MSBs of the first exponent and B#=8 MSBs of the second exponent.

I. If (A+B#)<2 and (B+A#)<2 are false, the exponent difference is at least 512. Therefore, the exponent difference is greater than the maximum shift value.

Since the least significant bit of A and B are the bit 9s of A and B, if the difference of A and B are not less than 2, the exponent difference of the first and second exponents is $2^9=512$.

II. If (A+B#)<2 is false and (B+A#)<2 is true, the first exponent is greater than the second exponent. Since (B+A#) is a negative sum, the negative sum of the 9 LSBs of the first and second exponents, namely (bits [8:0] of first exponent+inverted bits [8:0] of second exponent), are decoded to determine if the difference is equal to or greater than 432. If the negative sum of the 9 LSBs is less than 432, the exponent difference is greater than the maximum shift value of 80.

III. If (A+B#)<2 is true and (B+A#)<2 is false, the second exponent is greater than the first exponent. Similar to case II, since (A+B#) is a negative sum, the negative sum of the 9 LSBs of the first and second exponents, namely (bits [8:0] of second exponent+inverted bits [8:0] of first exponent), are decoded to determine if the difference is equal to or greater than 432. If the negative sum of the 9 LSBs is less than 432, the exponent difference is greater than the maximum shift value of 80.

Figure 7:
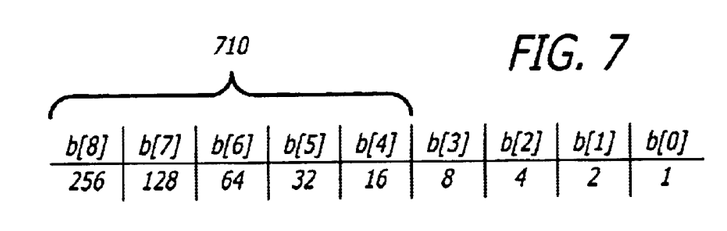
FIG. 7 illustrates the exponent bits with corresponding values in accordance to one embodiment of the invention.

IV. If (A+B#)<2 and (B+A#)<2 are true, the difference of the remaining 9 LSB [9:0] is checked to determine if the exponent difference is equal to or greater than the maximum shift value of 80. Here, each of the 9 LSBs need not be checked to determine if the exponent difference exceeds the maximum shift value. If bit 8 or bit 7 or (bit 6 and (bit 5 or bit 4)) 710 as shown in FIG. 7 is set, the total shift amount exceeds the maximum shift value. A bit is set if the value of a bit is "1." In one embodiment, if one of the sums of bit 8, bit 7, or (bit 6 and (bit 5 or bit 4)) is 1, then the total shift amount exceeds the maximum shift value.

Figure 8:
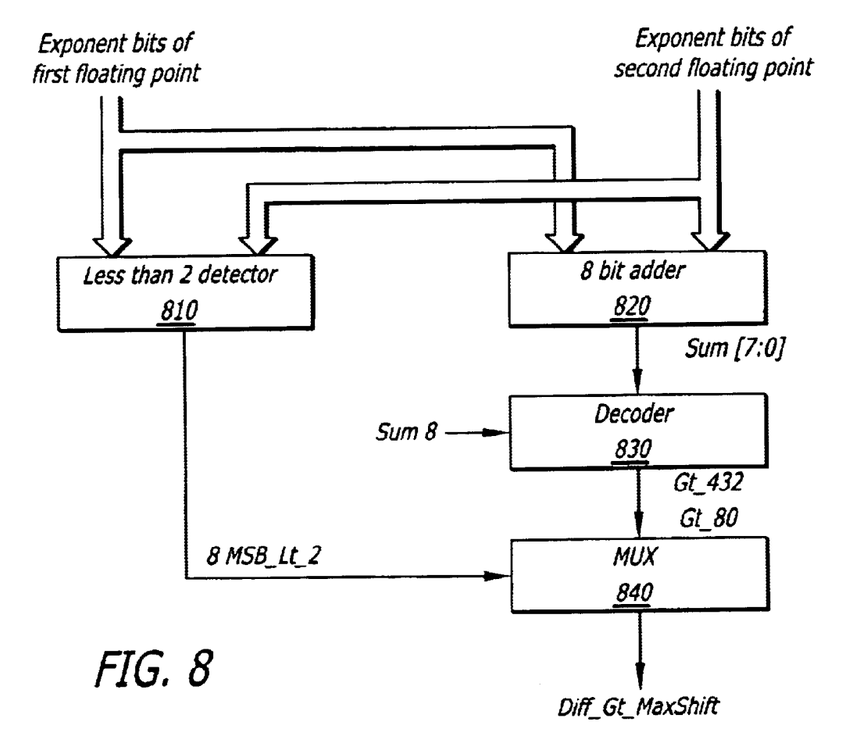
FIG. 8 illustrates a denormalization detecting unit in accordance to one embodiment of the invention.

Accordingly, if the exponent difference is greater than 80, denormalization is bypassed. FIG. 8 shows one possible embodiment of the denormalization detecting unit 175 to determine whether to bypass denormalization in the floating point calculation. The denormalization detecting unit 175 includes a less-than-two detector 810, an 8 bit adder 820, a decoder 830, and a multiplexer (MUX) 840. The less-than-two detector 810 compares the 8 MSBs of the exponents to determine if the difference is less than 2. In one embodiment, the less-than-two detector shown in FIG. 5 may be used as the less-than-two detector 810. The 8 bit adder 820 generally sums the 8 LSBs and the decoder 830 sums the remaining LSBs to the 8 LSBs and outputs signals Gt_432 and Gt_80 to the MUX 840. The MUX 840 outputs a Diff_Gt_Maxshift signal to indicate if the exponent difference exceeds the maximum shift value.

Particularly, the MUX 840 receives an 8MSB_Lt_2 signal as the control signal from the less-than-two detector 810 to output the Diff_Gt_Maxshift signal. For the given four cases above, an 8MSB_Lt_2 value of "00" may be encoded to indicate (A+B#) and (B+A#) are not less than 2, "01" may be encoded to indicate (A+B#) is not less than two while (B+A#) is less than two, "10" may be encoded to indicate (A+B#) is less than two while (B+A#) is not less than two, and "11" may be encoded to indicate (A+B#) and (B+A#) are less than two. While a 2 bit 8MSB_Lt_2 signal has been illustrated, different number of bits and/or different ways can be used to indicate the four cases.

Accordingly, if a 8MSB_Lt_2 signal indicates that the difference of 8 MSBs is not less than two, the denormalization can be bypassed. Otherwise, the remaining LSBs are checked to determine if the exponent difference, i.e. the total shift amount, exceeds the maximum shift value. Namely, if a 8MSB_Lt_2 signal indicates that either one of (A+B#) or (B+A#) is less than two, then the 9 LSBs are checked to determine if the negative sum of 9 LSBs is greater than 432. If a 8MSB_Lt_2 signal indicates that both (A+B#) and (B+A#) are less than 2, then LSBs [8:4] are checked to determine if the exponent difference is less than 80.

In one embodiment as shown in FIG. 8, both the MSB and LSB calculations are simultaneously performed. Therefore, the negative sum of 9 LSBs are calculated and the decoder 830 outputs a Gt_432 signal to indicate if the negative sum of 9 LSBs is greater than 432. Also, the LSBs [8:4] are checked and the decoder 830 outputs the Gt_80 signal to indicate whether the exponent difference is less than 80. If the 8MSB_Lt_2 signal indicates that the difference of 8 MSBs is not less than two, then the MUX outputs a Diff_Gt_Maxshift to indicate that the exponent difference exceeds the maximum shift value regardless of the Gt_432 and Gt_80 signals. If the 8MSB_Lt_2 signal indicates that either one of (A+B#) or (B+A#) is less than two, the MUX outputs a Diff_Gt_Maxshift to indicate that the exponent difference exceeds the maximum shift value, depending upon the Gt_432 signal. Namely, if the Gt-432 signal indicates that the negative sum of the LSBs is not greater than 432, the MUX outputs a Diff_Gt_Maxshift to indicate that the exponent difference exceeds the maximum shift value. If the 8MSB_Lt_2 signal indicates that both (A+B#) or (B+A#) is less than two, then the MUX outputs a Diff_Gt_Maxshift to indicate that the exponent difference exceeds the maximum shift value if the Gt_80 signal indicates that the exponent difference is not less than 80.

While the invention has been explained with a 17 bit exponent divided into two 8 bit segments and a single segment, a 64 bit mantissa, and a maximum shift value of 80, the teaching of the invention may be applied to other embodiments. For example, the exponent bits may be divided into different portions and an exponent difference using a predetermined number of MSBs, other than 8, can initially be calculated to determine if denormalization can be bypassed. Also, different values of the maximum shift value can be used such that not all LSBs need to be checked.

As described above, complex normalization and/or denormalization in floating point calculations can be avoided in accordance to the invention. Floating point calculations may be used as part of many different applications, including but not limited to rendering graphical objects in animation. For example, floating point calculations are necessary to perform alteration of three dimensional graphics.

In one embodiment, the invention can be implemented in the processor 105 of FIG. 1. Namely, the storage device 110 may have stored therein instruction(s) which when executed by the processor 105, causes the processor 105 to perform floating point calculations. By implementing the less-than-two detecting apparatus to bypass complex normalization and/or denormalization, the speed of the processor is significantly increased. Note here the invention can be partially or fully implemented by computer programs loaded into a computer readable medium.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A computer system comprising:

a processor;

a storage device coupled to the processor and having stored therein at least one instruction, which when executed by the processor, causes the processor to perform a floating point calculation; and a floating point unit included within the processor to perform the floating point calculation, the floating point unit comprises:

a normalization detecting unit to determine an exponent difference, being a difference between exponents of two floating point numbers, and to bypass a complex normalization performed on a result produced by the floating point calculation if the exponent difference between the two floating point numbers is not less than two, a normalization execution unit to perform the complex normalization if the complex normalization is not bypassed, and a denormalization detecting unit to determine to bypass denormalization if the exponent difference is equal to or greater than a predetermined shift value, the denormalization detecting unit comprises:

a less-than-two detector to determine if a predetermined number of most significant bits (MSB) of the exponent difference is less than two, and a selecting unit determining to bypass denormalization if the predetermined number of MSB of the exponent difference is not less than two.

2. The computer system of claim 1, wherein the normalization detecting unit comprises:

a less-than-two detector to detect if the exponent difference of the two floating point numbers is less than two;

a normalization determining unit determining whether to bypass the complex normalization.

3. The computer system of claim 2, wherein the less-than-two detector comprises:

a first detecting module to generate a first detection bit from the exponents of the first floating point number and the second floating point number, the first detection bit indicating whether the exponent difference of the two floating point numbers is zero;

a second detecting module to generate a second detection bit from the exponents of the first floating point number and the second floating point number, the second detection bit indicating whether the exponent difference of the two floating point numbers is one.

4. The computer system of claim 3, wherein the normalization determining unit combines the first and second detection bits to determine whether the exponent difference of the two floating point numbers is less than two.

5. The computer system of claim 3, wherein the first module comprises: a half summer summing exponent bits of the first floating point number and an inverted exponent bits of the second floating point number.

6. The computer system of claim 5, wherein the half summer is comprised of a XOR gate.

7. The computer system of claim 3, wherein the second detecting module comprises:

a first half summer to sum exponent bits of the first floating point number and inverted exponent bits of the second floating point number to generate a sum value;

an adder to sum the exponent bits of the first floating point number and the inverted exponent bits of the second floating point number to generated a carry value;

a second half summer to sum the sum value from the first half summer and a carry value corresponding to a previous sum value to generate the second detection bit.

8. The computer system of claim 7, wherein each of the first and second half summers is comprised of a XOR gate.

9. The computer system of claim 1, wherein the denormalization detecting unit further comprises:

a comparator to compare the bits other than the predetermined number of MSB of the exponents of the two floating point numbers; and the selecting unit determining to bypass denormalization if the exponent difference using the predetermined number of MSB is less than two and if the exponent difference of the bits other than the predetermined number of MSB is equal to or greater than the maximum shift value.

10. The computer system of claim 1, wherein the less-than-two detector comprises:

a first half summer to generate a first detection bit by half summing the predetermined number of MSB of an exponent of the first floating point number and inverted predetermined number of MSBs of an exponent of the second floating number;

an adder to sum the predetermined number of MSB of the exponent of the first floating point number and the inverted predetermined number of MSB of the exponent of the second floating point number to generated a carry value;

a second half summer to sum each first detection bit and a carry value corresponding to a previous first detection bit to generate the second detection bit;

the selecting unit combining the first and second detection bits to determine if the exponent difference using the predetermined number of MSB is less than two.

11. A computer-implemented method comprising:

decoding a computer instruction;

executing a floating point calculation on two floating point numbers including a first floating point number and a second floating point number in response to the decoded computer instruction, the floating point calculation comprising:

(a) bypassing complex normalization if an exponent difference of the two floating point numbers is not less than two;

(b) performing complex normalization if the complex normalization is not bypassed; and (c) bypassing denormalization if the exponent difference of the two floating point numbers is equal to or greater than the maximum shift value by determining if an exponent difference of a predetermined number of most significant bits (MSB) of the two floating point numbers is less than two and determining to bypass denormalization of the two floating point numbers if the exponent difference using the predetermined number of MSB is not less than two.

12. The method of claim 11, wherein (a) comprises:

generating a first detection bit from the exponents of the first floating point number and the second floating point number, the first detection bits determining if the exponent difference of the two floating point numbers is zero; and generating a second detection bit from the exponents of the first floating point number and the second floating point number, the second detection bit determining if the exponent difference of the two floating point numbers is one.

13. The method of claim 12, wherein in (b), combining the first and second detection bits to determine whether the exponent difference of the two floating point numbers is less than two.

14. The method of claim 12, wherein in (a), determining if the exponent difference of the two floating point numbers is zero by half summing exponent bits of the first floating point number and inverted exponent bits of the second floating point number.

15. The method of claim 12, wherein in (a), determining if the exponent difference of the two floating point numbers is one comprises:

half summing exponent bits of the first floating point number and inverted exponent bits of the second floating point number to generate a sum value;

summing the exponent bits of the first floating point number and the inverted exponent bits of the second floating point number to generated a carry value; and half summing the sum value and a carry value corresponding to a previous sum value to generate the second detection bit.

16. The method of claim 11, wherein (c) further comprises:

comparing the bits other than the predetermined number of MSB of the exponents of the two floating point numbers; and determining to bypass denormalization of the two floating point numbers if the exponent different using the predetermined number of MSB is less than two and if the exponent difference of the bits other than the predetermined number of MSB is equal to or greater than the maximum shift value.

17. A computer system comprising:

a processor;

a storage device coupled to the processor and having stored therein at least one instruction, which when executed by the processor, causes the processor to perform a floating point calculation on two first floating point numbers to produce a result; and a floating point unit in the processor to perform the floating point calculation, the floating point unit including a denormalization detecting unit to determine if denormalization is necessary for the floating point calculation, the denormalization detecting unit determining to bypass denormalization of a result of the floating point calculation if an exponent difference of the two floating point numbers is equal to or greater than the maximum shift value, the maximum shift value is set higher that a number of bits representing a mantissa of the result, the denormalization detecting unit comprises:

a less-than-two detector to determine if the exponent difference using a predetermined number of most significant bits (MSB) of the two floating point numbers is less than two, and a selecting unit to determine to bypass normalization of the two floating point numbers if the exponent difference of the two floating point numbers using the predetermined number of MSB is not less two.

18. The computer system of claim 17, wherein the denormalization detecting unit further comprises:

a comparator to compare the bits other than the predetermined number of MSB of the exponents of the two floating point numbers; and the selecting unit determining to bypass normalization of the two floating point numbers if the exponent difference using the predetermined number of MSB is less than two and if the exponent difference of the bits other than the predetermined number of MSB is equal to or greater than the maximum shift value.

19. A method comprising:

decoding a computer instruction;

executing a floating point calculation in response to the decoded computer instruction, the floating point calculation on two floating point numbers comprising:

(a) setting a maximum shift value higher than the number of bits representing a mantissa of the floating point numbers; and (b) determining to bypass denormalization of the two floating point numbers if an exponent difference of the two floating point numbers is equal to or greater than the maximum shift value by determining if the exponent difference of a predetermined number of most significant bits (MSB) of exponents of the two floating point numbers is less than two, and determining to bypass normalization of the two floating point numbers if the exponent difference using the predetermined number of MSB is not less than the two.

20. The method of claim 19, wherein (b) further comprises:

comparing a predetermined number of least significant bits (LSB) of the exponents of the two floating point numbers; and determining to bypass normalization of the two floating point numbers if a difference of the predetermined number of MSB of the exponents of the two floating point numbers is less than two and if a difference of the predetermined number of LSB is equal to or greater than the maximum shift value.

* * * * *